Sept. 15, 1953
W. C. HANSE
FISHING REEL
2,652,211
Filed June 7, 1950
2 Sheets-Sheet 1
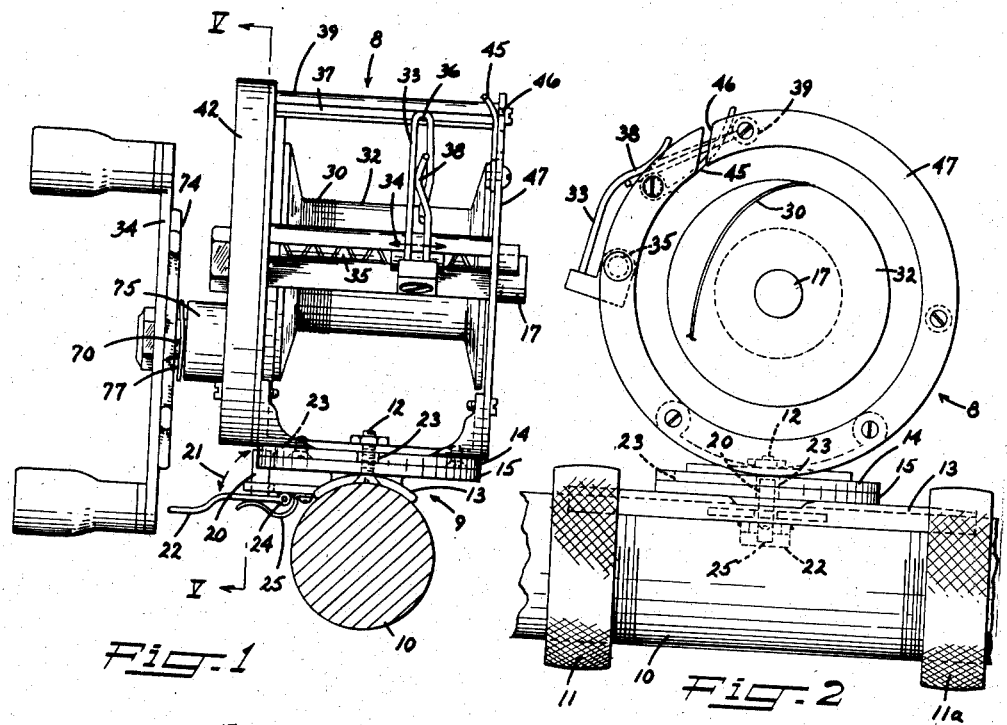
Fig. 1
Fig. 2
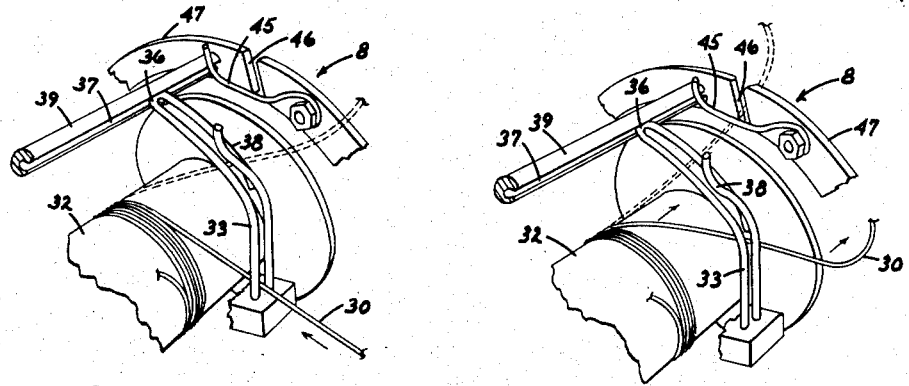
Fig. 3
Fig. 4
INVENTOR.
William C. Hanse Sept. 15, 1953       W. C. HANSE       2,652,211
FISHING REEL Filed June 7, 1950                    2 Sheets-Sheet 2

INVENTOR.
William C. Hanse

Patented Sept. 15, 1953

2,652,211

UNITED STATES PATENT OFFICE 2,652,211

FISHING REEL

William C. Hanse, Philadelphia, Pa.

Application June 7, 1950, Serial No. 166,647

8 Claims. (Cl. 242—84.4)

This invention relates to fishing reels and more particularly to casting reels which are pivotable with respect to the rods on which they are mounted.

In casting reels of the type in general use, the fishing line is stored on a spool so supported that its axis of rotation extends crosswise of the rod on which the reel is mounted. When casting with such a rod and reel, the thumb is held in frictional contact with the spool or the line stored thereon to control the rotation of the spool as desired. Considerable skill is required in regulating the pressure of the thumb to effect accurate casting and to avoid overrunning of the spool, a behavior known as backlashing. Even then, those experienced in casting practice occasionally make casts in which the lines become tangled as a result of backlashing.

To overcome this difficulty, various reels of the prior art provide spools which are either permanently aligned on an axis parallel with the rod or they may be rotated into such an axial alignment to permit discharge of the fishing line from the end of the spool during casting. If the line leaves the spool freely, accurate casting may be accomplished without the need for much skill and experience. However, when long casts are to be made, such as are often desired in surf-casting, it is necessary to provide a spool on which a considerable length of the line may be stored. On reels of the type adapted to deliver the line from the end of the spool and for storing up a couple of hundred yards or more of line, it is necessary that the line be wound onto the spool in such a manner that the line may leave the spool without restraint or jerking.

An object of this invention is to provide a casting reel adapted to discharge a line without rotation of its line-storage spool and to collect the line upon the spool in an orderly arrangement, preferably in concentric layers of parallel windings. It is also an object to provide a casting reel that can be quickly adjusted to winding position or casting position and can also be detachably mounted on a casting reel of conventional design. Another object is to provide a reel having its winding mechanism exterior of and readily separable from the rod on which the reel is mounted, so that reel and rod may be separated to render them more adaptable to storage or packaging. It is, furthermore, an object to provide a reel of which the winding mechanism is effectively enclosed to keep out sand or other abrasive material so as to reduce wear and to extend the service life of the reel. Still another object is to provide a winding mechanism for the reel having preferably, except for necessary modifications, the basic construction and advantageous features found in winding mechanisms of conventional reels of the type having their spools aligned transversely of the rods. Other objects, features and advantages will be apparent from the following description of the invention and the drawing relating thereto in which Fig. 1 is an elevation view in winding position of a reel according to the invention mounted on a fishing rod that is shown in cross section;

Fig. 2 is a side elevation of the reel as shown in Fig. 1;

Fig. 3 is a fragmentary pictorial view of a portion of the reel in the winding position;

Fig. 4 is a fragmentary view of a portion of the reel in the casting position;

Figure 5:
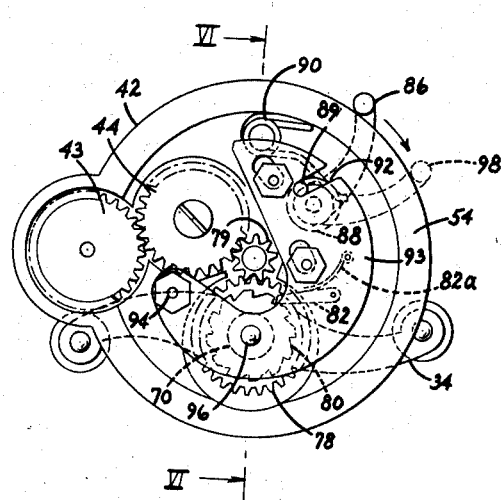
Fig. 5 is a section view taken along line V—V of Fig. 1 illustrating the winding mechanism of the reel.

In brief, a casting reel in accordance with the present invention comprises a support base adapting the reel for attachment to a fishing rod, the cage pivotably supported on the base, and a line-storage spool rotatably supported within the cage on a cantilever shaft, the cage being open at the end adjacent the unsupported end of the shaft for discharging the line endwise from the spool through the open end of the cage, and the cage also supporting a winding mechanism and a reciprocable line-guide mechanism which operate in synchronism, with the line-guide and the cage being constructed to permit transfer of the line from the guide to the open end of the cage, or vice versa.

Fig. 1 illustrates a cage 8 of a fishing reel according to the invention pivotably mounted in turn-table arrangement on a base 9. The base 9 is secured to a conventional fishing rod 10 by nuts or rings 11 and 11a which may be screwed into overlapping relationship with element 13 of the base which extends along the rod. The cage 8 may be rotated with respect to a pivot pin 12 extending from the base through the turn-table plate 14 of the cage. The plate 14 has a lower flat surface which slidably and rotatably engages the upper flat surface of the turn-table plate 15 of the base 9. The reel is shown in the winding position in Figs. 1 and 2 wherein the axis of a spool shaft 17 is aligned in a direction transversely of the rod 10. The reel, however, is instantly adjustable to a position in which the cage 8 is rotated 90 degrees relative to its winding position to a casting position in which the axis of the shaft 17 is aligned in a direction parallel with the rod 10. The reel is secured in either position by the engagement of a latch 20 which is swingable in a direction indicated by the double-headed arcuate arrow 21, with the notches 23 in the periphery of the plate 14. The latch is supported on a lever 22 which is pivotably secured to the base at 24. A spring 25 urges the lever upward for positive engagement of the latch with the plate 14. The lever 22 may be manipulated with the thumb of the hand in which the rod is gripped.

With the reel adjusted with respect to the rod 10 in the winding position as shown in Figs. 1 and 2, the winding mechanism hereinafter described may be operated to store the line 30 on the reel 32. As the winding mechanism is driven by revolving a crank 34, the spool 32 turns and a line-guide 33 reciprocates in the direction indicated by the double-headed arrow 34 as a result of the reverse-threaded screw 35 being in engagement with a pawl or thread-following element on which the guide 33 is mounted. The end 36 of the guide 33 follows a groove 37 of a cross bar 39 of the cage 8 to give the guide greater stability while traversing its reciprocal ambit. Driving relationship between the screw 35 and spool shaft 17 is obtained, as shown in Fig. 5, by engagement of a gear 43, mounted on the end portion of the screw, with an intermediate gear 44 in mesh also with the gear 79 of the spool shaft. By operation of the guide reciprocating mechanism in synchronism with the rotation of shaft 17, such as provided by the winding mechanism housed in a cap 42 covering one end of the cage, the line 30 may be stored on a reel 32 in orderly concentric layers of windings. This feature in combination with the feature of being able to rotate the reel into a casting position for discharging of the line from the end of the spool makes the reel of the invention particularly adaptable to the type of fishing known as surf-casting in which it is desirable to use and to store on the reel comparatively great lengths of line, particularly when casting is to be done at high tide.

To adjust the reel for casting position, the line 30 is manually transferred through the split portion of the guide 33 at 38 as illustrated in ghost outline in Fig. 3 and slipped around a flexible wire guard 45 and through an open section 46 of the cage ring 47. The line 30 may then be pulled off the end of the spool 32 in the direction of the arrows as shown in Fig. 4. When the reel is returned to the winding position, the transfer of the line through the cage ring 47 into the guide 33 may be effected in a manner reverse to that just described. By manipulation of the turn-table latch and transferring the line from one position to the other as shown in Figs. 3 and 4, the reel may be adjusted from winding position to casting position, or vice versa, almost instantly.

However, to provide a reel for delivering line from one end of the storage spool, it is necessary to support the shaft 17 at or adjacent one end since one of the two bearings used at the ends of the cage of conventional reels to support the spool shaft is eliminated. Fishing reels having a spool shaft supported at one end only are common among the prior art devices which, however, avoid the complex problem of supporting the spool shaft at one end while providing winding and guide-traversing mechanism. The problem is particularly acute if the spool is to have sufficient length to provide the capacity for storing a long casting line. In the reel of the present invention, ample bearing support is provided for a spool shaft unsupported at one end to permit endwise delivery of the line, the shaft being in drive relationship with the winding and reciprocable-guide mechanisms.

In accordance with the present invention, the unsupported end of shaft 17 is stabilized or prevented from eccentric movement by providing a bearing support for the shaft at both sides of the portion of the shaft in drive relationship with the winding mechanism contained within the cap 42. In the reel illustrated, a bearing 50 is mounted in the cap 42 which corresponds to a similar bearing found in reels of known design. However, additional bearing support is given the shaft 17 by an annular plate-like bearing member 52 which has a flange 53 adapting the plate to be secured tightly by fasteners such as screws or bolts to the outer circumferential margin 54 of the cap 42. A radially inwardly extending flange or hub portion 69 engages the shaft 17 in bearing relationship. When the reel is assembled, the flange 53 is secured firmly between the cap and the ring 55 of the cage 8.

The bearing member 52, being apertured only for extension therethrough of fasteners, the shaft 17, etc., in cooperation with the cap 42 effectively encloses the gears of the winding mechanism housed between it and the cap 42. The cap and member 52 constitute a housing attached to the cage 8. In conventional reels, the winding mechanism is enclosed by the cap of the reel and the adjacent end of a line-storage spool, leaving a clearance between the spool and the cap or a cage ring secured to the cap, through which sand or grit, carried to the reel by the line, may pass into the winding mechanism. In the reel of the present invention, there is no analogous clearance through which dirt particles may enter the winding mechanism. By including a closed type bearing member adjacent the spool, such as the member 52, a further important advantage of the invention is realized, that of extending the serviceability of a reel by keeping the mechanism more free from abrasive materials.

Figure 6:
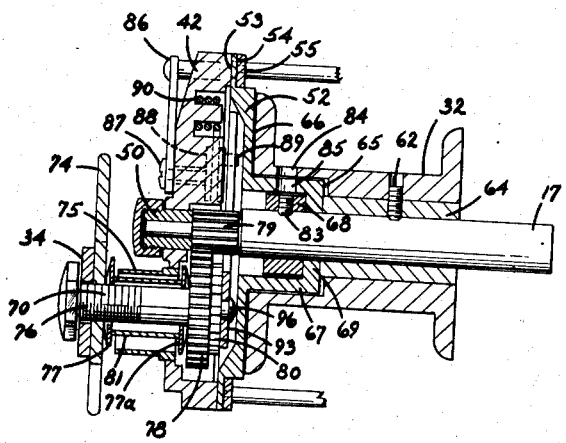
Fig. 6 is a section view of a portion of the reel taken along line VI—VI of Fig. 5.

A spool 32 on which to store a fishing line is secured firmly on the shaft 17 by a set screw 62 or other means. As shown, the spool is constructed with a sleeve 64 of brass or other non-corrosive metal to provide a durable bearing surface between the spool and the end surface 65 of member 52. Preferably the end thrust of the spool against the member 52 occurs between the sleeve 64 and the surface 65 of the member rather than, for example, between the much larger surfaces 66 of the member and the large end area of the spool 32 so that operation of the reel is not unnecessarily handicapped by frictional drag. The spool 32 is annularly recessed from one end to accommodate a cylindrical extension 67 of the member 52 with sufficient clearance that the spool may rotate without contact with the outer cylindrical surface of the extension. The flange 69 of the extension serves as a bearing for radial loads imposed by the shaft and end-thrust toward the left (as viewed in Fig. 6) of the spool 32. End-thrust of the shaft toward the right is opposed by engagement of the surface of the flange 69 facing toward the cap 42 with a collar 68 secured to the shaft 17 by a set screw 83. Thus, the flange 69 in conjunction with the bearing 50 constitutes a bearing arrangement for rotatably supporting the shaft 17 whereby the shaft may be accurately positioned in a direction lengthwise of its axis and the unsupported end portion of the shaft may be subjected to force laterally of its axis without excessively loading or straining any portion of the reel. Access to the set screw 83 may be had through apertures 84 and 85 of the spool and the member 52, respectively. The inner axially-extending surface of the extension 67 of the housing member 52 is not only spaced with respect to the circumference of the shaft 17 but also has clearance, as shown in Fig. 6, with the peripheral surface of the end thrust bearing element enclosed thereby, i. e., the collar 67.

As shown, the reel is provided with a "star drag" permitting adjustable frictional drive relationship between the spool shaft 17 and a shaft 70 on which a crank 34 is secured. The star drag is a frictional clutch system of which the shaft 70 and a ratchet gear secured thereto are analogous to a driving member, and a main winding gear 78 rotatably supported on the shaft corresponds to a driven member of the system. The drag device may be adjusted to permit rotation of the spool shaft without rotation of the winding shaft 70 in response to a desired degree of tension in the line such as produced by a fish. For winding, or when the reel is adjusted for paying the line out under tension as when playing a fish, the gear 78 is positioned to mesh with a gear 79 secured to the shaft 17 in non-rotatable relationship.

Adjustments in the relative drag between the shafts 70 and 17 are obtained by a clutch arrangement wherein a control member comprising radial fingers 74, adapting the control member for manual manipulation, may be rotated relative to the shaft 70 on threads 76 thereof against a spring washer 77. The pressure exerted on the washer 77 as a result of turning the control 74 is transmitted through a sleeve 81 which extends eccentrically within an annular housing 75, and a washer 77a to the left side of the winding gear 78 which is rotatable with respect to the shaft 70. The gear 78 is forced into sidewise frictional contact with the ratchet gear 80 which engages a pawl 82 best shown in Fig. 5. The pawl 82 is held in constant engagement by a spring 82a with the gear 80 and permits rotation of the winding shaft 70 in one direction only, i. e. for winding, and in the counter-clockwise direction viewed in Fig. 5. With the lever 74 adjusted to produce friction in the drag device which resists the discharging of the line from the spool, and with sufficient tension exerted on a portion of the line extending tangentially from the spool 32 to rotate it, the gear 78 turns relative to the shaft which is held from turning by the pawl 82 in engagement with ratchet gear 80. The gear 78 also turns with respect to the ratchet gear 80 and the washer 77a which frictionally engage both sides of the gear 78.

If for any reason, it is desired to cast the line by letting it pay out through the guide 33 with the spool axis aligned transversely of the rod, the winding mechanism may be disengaged from drive relationship with the spool shaft by swinging lever 86 in the direction of the arrow to the position 98 shown in ghost outline. The lever 86 pivots on the cap screw 87 which extends through the cap 42 into threaded relationship with a peripherally grooved disc element 88. A pin 89 is secured to the element 88 and extends through the peripheral groove to act as a cam therein for engaging the end of a spring 90 which urges the lever in one position or the other. The pin 89 also extends laterally through a slot 92 in a plate member 93. This member pivots on a bolt 94 which extends through the cap 42, and supports the end of the shaft 70 by extension of a rivet 96 through the plate into the end portion thereof. Movement of the plate about its pivot 94 by shifting the lever 86 carries the gear 78 into and out of engagement with the gear 79. By movement of the lever 86 to the position 98, the gear 78 is carried out of mesh with the gear 79 to permit free rotation of the spool for a purpose such as casting with the line paying out through the traverse guide.

The reel of the present invention is constructed preferably (as shown in the drawing) so that it may be attached to standard fishing rods and removed therefrom when not in actual service so that the rod and reel may be more compactly packaged for storing or carrying. The reel is constructed so that the desirable features such as a reciprocating line guide, winding mechanism, and brake mechanism for retarding tensioning the line being discharged, of a conventional reel having its spool axis extending transversely of the rod, may be incorporated into a reel which is rotatable from a winding position to casting position, and the reel has an open end concentric with respect to the unsupported end of the cantilever spool shaft to permit discharge of the line endwise from the spool through the open end without rotation of the spool, such an improved reel being also able to store a long line. Another important feature is that the pivotable mounting and the split line-guide and the split cage ring enable the reel to be changed from the casting to the winding operations or vice-versa very quickly and without the need for relacing the reel.

While preferred embodiments of the invention have been shown and described, it is to be understood that changes and variations may be made without departing from the spirit and scope of the invention as defined in the appended claims.

I claim:

1. In a casting reel comprising an annular cage, one end of the cage being enclosed by a housing joined thereto, the housing comprising an inner member facing toward the cage and an outer member facing away from the cage, a bearing in each member disposed concentrically about the axis of the cage in spaced relationship with the bearing of the other member, a shaft extending coaxially through the cage and the bearings, and a winding mechanism in driving relationship with the shaft; in combination therewith a line-storage spool supported on a portion of the shaft extending within the cage and outside of the housing, the spool having an annular recess concentric to said shaft which extends inwardly from the end of the spool adjacent the housing, the bearing of the adjacent inner member being disposed within said recess by an axially-protruding portion of the member extending into the recess in spaced relationship, and free from contact, with the shaft and the axially-extending surface of the recess, the driving connections of said mechanism and the shaft being disposed entirely within the housing and between said bearings.

2. In a casting reel comprising an annular cage, one end of the cage being enclosed by a housing joined thereto comprising an inner member facing toward the cage and an outer member facing away from the cage, a bearing in each member disposed concentrically about the axis of the cage in spaced relationship with the bearing of the other member, a shaft extending coaxially through the cage and the bearings, a reciprocable line-guide slidably supported by the cage for movement in a direction lengthwise thereof, a winding mechanism in driving relationship with the shaft, and a reverse screw mechanism for traversing the guide in driving relationship with the winding mechanism, the driving connections of said mechanisms and the shaft being disposed entirely within the housing; in combination therewith, a line-storage spool supported on a portion of the shaft extending through the cage and outside the housing having an annular recess concentric to said shaft and extending inwardly of the spool from the end thereof adjacent the housing, the bearing of the inner member being disposed within said recess by an axially-protruding portion of the member extending into the recess in concentric spaced relationship, and free from contact, with the shaft and the axially-extending surface of the recess, the shaft having a radially-extending thrust-bearing element disposed substantially within said axially-protruding member portion in engagement with the inner surface of the bearing of the other member.

3. In a casting reel comprising an annular cage, one end of the cage being enclosed by a housing joined thereto, the housing comprising an inner member facing toward the cage and an outer member facing away from the cage, a bearing disposed in each member concentrically about the axis of the cage in spaced relationship with the bearing of the other member, a shaft extending coaxially through the cage and bearings, a reciprocable line-guide slidably supported by the cage for movement in a direction lengthwise thereof, a winding mechanism in driving relationship with the shaft, a reverse screw mechanism for traversing the guide in drive relationship with the winding mechanism, means disposed within the housing having a control disposed exteriorly of the housing for disengaging the driving connection of the winding mechanism and the shaft, and brake means disposed within the housing having an adjustable control disposed exteriorly of the housing for retarding the rotation of the winding mechanism, the driving connections of said mechanism and the shaft being disposed entirely within the housing and between said bearings; in combination therewith, a line storage spool supported on a portion of the shaft extending through the cage and outside of the housing having an annular recess concentric to the shaft and extending inwardly of the spool from the end thereof adjacent the housing, the bearing of the inner member being disposed within said recess by an member being disposed within said recess by an axially-protruding portion of the member extending into the recess in concentric spaced relationship, and free from contact, with the shaft and the axially-extending surface of the recess, the shaft having a radially extending bearing element disposed at least substantially within said axially-protruding member portion in engagement with the inner end surface of the bearing of the inner member.

4. In a casting reel comprising an annular cage, one end of the cage being enclosed by a housing joined thereto, the housing comprising an inner member facing toward the cage and an outer member facing away from the cage, a bearing disposed in each member concentrically about the axis of the cage in spaced relationship with the bearing of the other member, a shaft extending coaxially through the cage and the bearings, and a winding mechanism in driving relationship with the shaft, the driving connection of said mechanism on the shaft being disposed entirely within the housing and between said bearings; in combination therewith a line-storage spool supported on the portion of the shaft extending through the cage and outside of the housing, the spool having an annular recess concentric to said shaft and extending inwardly from the end of the spool adjacent the housing, the bearing of the inner member being disposed entirely within said recess adjacent the bottom thereof by an axially-protruding portion of the member extending into the recess in concentric spaced relationship, and free from contact, with the shaft and the axially-protruding surface of the recess, the shaft having radially-extending thrust-bearing surfaces in fixed relationship therewith for engaging opposite ends of the bearing of the inner member.

5. In a casting reel comprising a base for securing the reel to a casting rod, an annular cage pivotably supported on the base and having an open end defined by a split ring, the other end of the cage being enclosed by a housing joined thereto, the housing comprising an inner member facing toward the cage and an outer member facing away from the cage, a bearing in each member disposed concentrically about the axis in spaced relationship with the bearing of the other member, the shaft extending coaxially through the cage and the bearing, a reciprocable line-guide slidably supported by the cage for movement in a direction lengthwise thereof, a winding mechanism connected in driving relationship with the shaft, a reverse-screw mechanism for traversing the guide connected in driving relationship with the winding mechanism, the driving connections of said mechanisms and the shaft being disposed entirely within the housing and between said bearings; in combination therewith, a line-storage spool supported on a portion of the shaft extending through the cage and outside of the housing, the spool having an annular recess concentric to said shaft and extending inwardly from the end of the spool adjacent the housing, the bearing of the inner member being disposed near the bottom of said recess by an axially-protruding portion of the member which extends into the recess in spaced relationship, and free from contact, with the shaft and at close clearance with the axially-extending surfaces of the recess, said shaft having thrust-bearing elements fixed thereon for engagement with opposite ends of the bearing of the inner member, the element which engages the inner end of the bearing being disposed substantially within said axially-protruding member portion.

6. A reel as defined in claim 5 comprising means for securing the inner thrust-bearing element to the shaft, said means being removable from the shaft in a radially outward direction extending in radial alignment with an axially-extending section of said axially-protruding bearing supporting portion of the inner member, said axially-extending section having an aperture with respect to which the element securing means rotates into registry therewith for passage of said means through the aperture.

7. In a casting reel comprising an annular cage having an open end defined by a ring portion, a housing joined to the cage for enclosing the other end of the cage, the housing comprising an inner member facing into the cage and an outer member facing away from the cage, a bearing in each member disposed concentrically about the axis of the cage in spaced relationship with the bearing of the other member, a shaft extending coaxially through the cage and the bearings, and a winding mechanism in driving relationship with the shaft; in combination therewith, a line-storage spool supported on a portion of the shaft extending within the cage and outside of the housing, the spool having an annular recess concentric to the shaft which extends inwardly from the end of the spool adjacent the housing, the bearing of the adjacent inner member being disposed adjacent the bottom of the recess by an axially-protruding portion of the member extending into the recess in spaced concentric relationship, and free from contact, with the shaft and the axially-extending surface of the recess, the portion of the shaft which extends into the housing having a diameter no greater than the inner diameter of the bearing of the inner member, a thrust-bearing element on the shaft for engaging the inner end of the bearing disposed within the recess, means for securing the element to the shaft, said bearing element being substantially housed within the axially-protruding portion of the inner member, the drive connection of said mechanism being disposed entirely within the housing, said shaft being removable from the housing lengthwise of its axis through the open end of the cage upon disengagement of the means for securing the element and the shaft.

8. A reel as defined in claim 7 wherein the means for securing the element to the shaft comprises a set screw extending radially through the thrust-bearing element into engagement with the shaft, said axially-protruding portion of the inner member having a radially-extending aperture with respect to which the set screw rotates into registry and is removable therethrough.

WILLIAM C. HANSE.

References Cited in the file of this patent

UNITED STATES PATENTS

| Number | Name | Date |
| --- | --- | --- |
| 467,849 | Bean | Jan. 26, 1892 |
| 736,130 | Mitchell | Aug. 11, 1903 |
| 1,114,084 | Wells | Oct. 20, 1914 |
| 1,341,519 | Reuze | May 25, 1920 |
| 2,034,917 | Miller | Mar. 24, 1936 |
| 2,352,138 | Torrence | June 20, 1944 |
| 2,439,298 | Horan | Apr. 6, 1949 |

FOREIGN PATENTS

| Number | Country | Date |
| --- | --- | --- |
| 150,443 | Great Britain | Sept. 6, 1920 |